3,528,959
MODIFIED TALL OIL EMULSIFIERS
Paul D. Patrick, Jr., and Brantley D. Thomas, Jr., Charleston, S.C., assignors to Westvaco Corporation, New York, N.Y., a corporation of Delaware
No Drawing. Filed Dec. 26, 1967, Ser. No. 693,124
Int. Cl. C09f 1/04
U.S. Cl. 260—97.5                                    9 Claims

ABSTRACT OF THE DISCLOSURE

Treated tall oil products for use as emulsifiers in the manufacture of synthetic rubber wherein tall oil is first disproportionated, preferably with iodine, to contain less than two percent abietic type acids and less than two percent linoleic acid and the disproportionated tall oil is then contacted with a boron trifluoride catalyst at elevated temperatures. The thus treated tall oil is steam sparged and thereafter subjected to a separation process to remove high and low boiling components. The tall oil product may then be converted to a soap to give a rubber emulsifier possessing reduced oxygen sensitivity, outstanding polymerization rates, color, color stability and capable of making a synthetic rubber with excellent physicals properties.

---

This invention relates to methods of treating tall oil acids to greatly increase their utility as emulsifiers in synthetic rubber manufacture.

A principal object of this invention is to modify fractions of tall oil so as to produce a tall oil product which when converted into a soap can be more satisfactorily employed as an emulsifier in emulsion polymerization. A further object is to produce an emulsifier that is not so sensitive to oxygen and gives improved physicals.

Tall oil is a natural mixture of rosin acids and fatty acids, together with unsaponifiable materials, which is obtained by acidifying the black liquor skimmings of the sulfate process of wood pulp manufacture, using resinous woods such as pine. The composition of tall oil varies somewhat depending upon such factors as the species of the wood which was pulped. Crude tall oil acids will generally contain 18 to 60% fatty acids, 28 to 66% rosin acids and 3 to 24% unsaponifiable materials. For the purpose of this invention crude tall oil acids may be used; however it is preferable to use distilled tall oil. The distillation may be carried out by introducing crude tall oil into a fractionation unit to separate the volatile fraction of crude tall oil from the non-volatile or pitch. Except for some separation of palmitic and more volatile acids in the first fraction, tall oil distillates have nearly the same composition as the crude tall oil. A typical tall oil distillate may contain from 30 to 66% rosin acids, from 37 to 52% tall oil acids and from 3 to 12% unsaponifiable materials. Various ratios of fatty acid to rosin acid may be used including either the fatty acid fraction or rosin acid fraction in addition to the mixed acids.

The fatty acid fraction contains saturated and unsaturated fatty acids and the rosin acid fraction contains a number of different rosin acids with the greatest portion concentrated in the following typical analysis which is intended to be suggestive and not limiting.

| Fatty acid fraction: | Percent |
|---|---|
| Saturated acids | 7.8 |
| Oleic acid | 39.2 |
| Linoleic acid | 26.1 |
| Conjugated dienoic acids | 15.4 |
| Other fatty acids | 11.5 |
| | 100.0 |

| Rosin acid fraction: | |
|---|---|
| Dihydropimaric | 2.0 |
| Pimaric type | 13.6 |
| Dihydroabietic | 3.8 |
| Palustric | 9.2 |
| Abietic | 43.8 |
| Dehydroabietic | 21.4 |
| Neoabietic | 6.2 |
| | 100.0 |

The unsaponifiable materials consist mainly of hydrocarbons, high molecular weight alcohols, primarily sterols, and small quantities of degradation products of lignin compounds.

All efforts heretofore, however, to employ tall oil in the preparation of soaps for utilization as emulsifiers in an emulsion polymerization process have been limited because of the adverse effects in the polymerization process of various constituents. The adverse effects of the tall oil soaps generally manifest themselves by inhibiting the polymerization rate and by lowering the physical properties of the polymer produced.

It has been discovered that if tall oil is first disproportionated to reduce the content of abietic type acids and linoleic acid to less than two percent and the thus disproportionated tall oil is contacted with a boron trifluoride catalyst that the resultant product after removal of certain minor constituents and conversion to the soap, can be more easily employed in emulsion polymerization.

Both crude tall oil acids and distilled tall oil acids are relatively unstable due to the presence of double bonds in the abietic type rosin acids and the linoleic acid of the fatty acid fraction. These compounds, containing double bonds, when taken together constitute about half of the tall oil acids. Several proposals have been made to reduce the large content of materials containing double bonds by disproportionation of the tall oil acids. While such proposals have resulted in extensive reductions in the amount of double bonds, soaps prepared from disproportioned tall oil have generally not given equivalent polymerization rates to the commonly employed partially hydrogenated-tallow fatty acid and disproportionated wood rosin soaps used in emulsion polymerization and have generally resulted in rubbers with appreciably lower physicals.

In general, disproportionation is carried out by contacting tall oil with a catalyst and heating. Some of the well-known catalyst include nickel (U.S. 2,617,792), sulfur dioxide (U.S. 2,794,017) and iodine (U.S. 2,311,386). Of these catalysts iodine is preferred. Essentially, during a disproportionation reaction, hydrogen is removed from some of the components and transferred to other components. The disproportionated product thus becomes a stabilized mixture of dehydrogenated and hydrogenated components. The extent to which the reaction is completed can be followed by ultra violet measurement of the fatty and rosin acids. Gas-liquid chromatography (GLC) is useful in the determination of components detrimental to polymerization activity. This initial step is carried out until the abietic type acids and linoleic acid content are both reduced to less than two percent.

The disproportionated tall oil is treated with a boron trifluoride catalyst wherein the boron trifluoride is absorbed. The tall oil thus treated is exposed to a heat treatment process and then sparged in the presence of steam. The boron trifluoride catalyst may be employed as such or in a combination form with various organic compounds such as ethers, alcohols, acids and amines.

The thus treated tall oil product is subject to a separation in which it is desired to remove all components having a boiling point lower than 16 carbon fatty acids, and all components having a higher boiling point than any of the monomeric rosin acids. The removal of these detrimental compounds is easily accomplished by a fractional distillation in which a heads fraction and a pitch fraction is removed. The heads fraction contains breakdown products from the iodine treatment and in the case where crude oil was employed as the starting material, various volatile products originally present in the crude tall oil. The heads fraction will vary from about 3 to 10% of the total tall oil depending a great deal on whether crude or a distilled tall oil was utilized as the starting material; the higher percentages being obtained where crude was used. The pitch fraction contains a number of different type materials including dimerized acids, degradation products of lignin compounds and interesters. The amount of pitch will generally be between 10 and 25% of the treated product with the higher quantities of pitch being obtained when crude tall oil is employed as the starting material.

Illustration of the practice of the invention is presented in the following examples.

EXAMPLE 1

A tall oil distillate was disproportionated according to the procedure set forth in U.S. Pat. 2,311,386. A kettle was charged directly from the distillation unit and was disproportionated with iodine until less than two percent abietic type acids and linoleic acid remained. The disproportionated product was then steam sparged starting at about 485° F. (252° C.) over one hour and was labeled kettle oil. A portion of the kettle oil was redistilled. The isomer distribution of both products measured by gas-liquid chromatography (GLC) was:

|  | Percent | |
|---|---|---|
|  | Kettle oil | Redistilled |
| Fatty acid fraction: | | |
| Saturated acids | 9.7 | 8.7 |
| Oleic acid | 74.5 | 83.3 |
| Other fatty acids | 15.8 | 8.0 |
| Total | 100.0 | 100.0 |

|  | Percent | |
|---|---|---|
|  | Kettle oil | Redistilled |
| Rosin acid fraction: | | |
| Hydrogenated pimaric | 12.2 | 11.6 |
| Hydrogenated abietic | 10.3 | 9.1 |
| Dehydroabietic | 71.1 | 73.7 |
| Others | 6.4 | 5.6 |
| Total | 100.0 | 100.0 |

A chemical analysis of the redistilled acids revealed the following properties:

Acid number _____ 182.0
Fatty acids, percent _____ 47.3
Rosin acids, percent _____ 47.3
Unsaponifiable, percent _____ 5.4
Abietic acid, percent _____ 0.90

EXAMPLE 2

A disproportioned tall oil (kettle oil) made according to procedure in Example 1 was divided into six samples to determine the effects of a boron trifluoride catalyst and heating temperature on polymerization rates. The first three samples were treated with 0.07% BF$_3$, 0.12% BF$_3$, and 0.19% BF$_3$ by raising the temperature to 150° C. over 30 minutes and then held there for 15 minutes. Following the initial reaction the complex was heated to 200° C., held there an additional 15 minutes, then steam sparged at 250° C. for 30 minutes. The last three portions were boron trifluoride treated at 0.05%, 0.1%, and 0.165% respectively and using the same procedure as before except heat treating at 250° C. rather than 200° C. Each of the products was distilled to give approximately 85% distillate. Duplicate polymerizations using the procedure set out in Example 5 with the distillates at 38 p.p.m. of oxygen were carried out at extremely low activator levels. The results appear in the table below.

|  | Percent BF$_3$ used heated at 200° C. | Conversion, percent | | |
|---|---|---|---|---|
|  |  | 2 hours | 4 hours | 6 hours |
| Emulsifier Sample: | | | | |
| 1 | 0.0 | 0.6 | 0.8 | 0.5 |
|  |  | 1.0 | 0.8 | 2.3 |
| 2 | 0.07 | 0.5 | 5.0 | 16.5 |
|  |  | 0.3 | 5.0 | 22.0 |
| 3 | 0.12 | 0.2 | 0.5 | 11.3 |
|  |  | 0.5 | 0.5 | 0.7 |
| 4 | 0.19 | 0.5 | 1.4 | 16.8 |
|  |  | 1.0 | 0.7 | 14.8 |
| 5 | 0.05 | 2.9 | 26.5 | 59.0 |
|  |  | 11.8 | 39.3 | 70.0 |
| 6 | 0.10 | 10.6 | 36.0 | 66.5 |
|  |  | 16.1 | 41.0 | 70.5 |
| 7 | 0.165 | 5.6 | 33.7 | 52.8 |
|  |  | 2.9 | 27.5 | 51.8 |

The results indicate there is no correlation between the amount of boron trifluoride used and the polymerization activity. However, samples 5 through 7 show marked improvement over samples 2 through 4 in polymerization activity indicating that the heat treatment is very important. Treatment of the distilled disproporionaed tall oil with a boron trifluoride catalyst prior to redistillation improves the desirable properties of the emulsifier.

EXAMPLE 3

An emulsifier was made according to the procedures of Example 1 and 2. Polymerizations were run in order to show a reduction in oxygen sensitivity and improved polymerization rates of a boron trifluoride treated emulsifier. The improvement was clearly shown by the table below.

|  | Percent conversion | |
|---|---|---|
| Air content, p.p.m. | Kettle oil redistilled | BF$_3$ treated kettle oil redistilled |
| Conversion time, hours: | | |
| 2 | 0 | 22.4 | 24.7 |
| 4 | 0 | 44.3 | 45.4 |
| 6 | 0 | 63.9 | 64.0 |
| 2 | 19 | 1.1 | 5.5 |
| 4 | 19 | 11.6 | 22.2 |
| 6 | 19 | 28.5 | 42.3 |

EXAMPLE 4

A tall oil distillate (feedstock was disportioned with iodine and steam sparged (according to the procedure outlined in Example 1) to form kettle oil. The kettle oil was contacted with 0.10 to 0.12% boron trifluoride catalyst based on the kettle oil. The contact temperature was about 350° F. (177° C.). After initial contact of about 30 minutes the kettle oil was then heated rapidly to about 520° F. (271° C.) followed by steam sparging. The treated product was distilled (distillate approximately 80%). The isomer distribution of each product measured by gas-liquid chromatographic (GLC) analysis on a percent basis of both fraction was:

|  | Feed stock | Kettle oil | $BF_3$ treated kettle oil | Distillate 80% |
|---|---|---|---|---|
| Acid: |  |  |  |  |
| Saturated acids | 4.6 | 5.6 | 5.1 | 4.9 |
| Oleic | 23.1 | 46.2 | 45.3 | 43.8 |
| Linoleic | 15.4 | 0.7 | 0.3 | 0.4 |
| Other fatty acids | 12.8 | 4.6 | 6.0 | 8.9 |
| Fatty acid total | 55.9 | 57.1 | 56.7 | 58.0 |
| Pimaric | 3.0 | 0.0 | 0.6 | 0.6 |
| Palustric | 3.2 | 0.0 | 0.4 | 0.0 |
| Isoprimaric | 2.6 | 0.0 | 0.0 | 0.0 |
| Abietic | 20.5 | 0.7 | 0.4 | 0.2 |
| Dehydroabietic | 9.5 | 31.6 | 31.9 | 30.6 |
| Neoabietic | 2.0 | 0.0 | 0.0 | 0.0 |
| Other rosin acids | 3.3 | 10.6 | 10.0 | 10.6 |
| Rosin acid total | 44.1 | 42.9 | 43.3 | 42.0 |
| Chemical analysis: |  |  |  |  |
| Acid No |  | 177.3 | 172.0 | 178.5 |
| Saponification No |  | 184.0 | 173.1 | 180.4 |
| Rosin acids, percent |  | 42.0 | 41.2 | 42.4 |
| Unsaponifiable, percent |  | 5.6 | 6.3 | 5.7 |
| Fatty acids, percent |  | 52.4 | 52.5 | 51.9 |
| Abietic acid, percent |  | 1.7 | 1.7 | 0.54 |
| Diene |  | 5.9 | 7.7 | 5.9 |
| Color, Gardner |  |  |  | 3+ |
| FA/RA ratio |  | 1.25/1 | 1.3/1 | 1.4/1 |

EXAMPLE 5

The styrene-butadiene rubber (SBR) polymerization is extremely sensitive to oxygen (air). To illustrate this fact a portion of the disproportionated redistilled tall oil acids of Example 1 were converted into a potassium soap solution. A 6% soap solution was prepared by adding 4 grams of potassium hydroxide pellets to about 700 ml. of distilled water and boiling for about 3 minutes, removing from the heat and immediately bubbling $N_2$ through the alkaline solution. While still hot, 28.7 grams of the redistilled disproportionated tall oil acids of Example 1 (previously heated to about 125° F.) was added to the solution with stirring. Next 2.76 grams of potassium chloride and 1.04 grams Tamol N was dissolved in about 100 ml. distilled water, and added to the soap solution, the pH was adjusted to a range of 10.4–10.8. The soap solution was transferred into a 1000 ml. flask and brought up to volume with distilled water. The soap solution thus formed was evaluated as the emulsifier in an SBR polymerization.

A standard SBR polymerization recipe containing the following ingredients was used:

|  | Parts per 100 parts monomer | Reagent per 12 oz. bottle |
|---|---|---|
| Monomer: |  |  |
| Butadiene (100% basis) | 76 | 62 gms. |
| Styrene (100% basis) | 24 | 15.1 ml. |
| Total | 100 |  |
| Distilled water | 200.0 | 100 ml. |
| Emulsifier (5% potassium soap solution) | 4.35 | 58 ml. |
| Potassium chloride | 0.40 | 0.32 gm. |
| Tamol N | 0.15 | 0.12 gm. |
| Ferrous hepto sulfate [1] | 0.01 | 3.6 ml. |
| Trisodium salt of ethylene diamine tetracetic acid [1] | 0.0326 | |
| Sulfoxylate [1] | 0.036 | |
| p-Methane hydroxperoxide [2] | 0.06 | 2.5 ml. |
| Sulfole | 0.25 | 5.0 ml. |

[1] Activator solution; 0.8 grams ferrous hepto sulfate, 2.85 grams Trisodium salt of ethylene diamine tetra-acetic acid (Versene 100) and 2.0 grams sulfoxylate dissolved in 250 ml. distilled water.

[2] 3.2 grams (50 percent) p-methane hydroperoxide dissolved in 100 ml. styrene.

Polymerizations were carried out in 12-ounce bottles. Each bottle was rinsed with distilled water, flushed with nitrogen and charged with distilled water, the 6% soap solution, styrene and sulfole being, careful to keep out any oxygen. Next 66 grams of butadiene was weighed into each bottle and the butadiene was allowed to flash off to 62 grams, and capped immediately. Each bottle was shaken and placed in a bath of 41° F., allowing the bottles to rotate in the bath for approximately one hour then the bottles were removed and shaken. Next 2.5 ml. of the p-methane hydroperoxide solution was injected into the bottle by means of a hypodermic needle. The proper amount of oxygen was injected into the bottle. The oxygen sensitivity of an emulsifier was determined by injecting air into the bottle before activation. 11.3 cc. air was equivalent to 38 p.p.m. oxygen in this monomer system. The bottles were well shaken and 5 ml. of the activator solution was injected and the bottles returned to the bath. The oxygen sensitivity was determined by withdrawing samples and calculating the percent conversion. The results were run in duplicate and are shown above in Example 3.

Since one purpose of the boron trifluoride treatment is to improve polymerization performance SBR bottle polymerization tests were run following the procedure outlined above to illustrate this fact. Sample 2 is a distillate of the $BF_3$ treated-disproportionated tall oil from Example 4. The control sample used was an equal mixture of partially hydrogenated-tallow and disproportionated wood rosin. There was no air present and the test was run at an extremely low activator level.

|  | Conversion, percent | | |
|---|---|---|---|
|  | 2 hours | 4 hours | 6 hours |
| Sample: |  |  |  |
| 1 (control) | 21.2 | 41.0 | 62.2 |
| 2 | 25.1 | 44.4 | 65.0 |

The result indicates that the polymerization rate of a boron trifluoride treated disproportionated tall oil is better than the commonly used partially hydrogenated-tallow disproportionated wood rosin mixture.

EXAMPLE 6

In order to evaluate the effect of emulsifiers on physical properties it is necessary to test the emulsifier in a commercial polymer and compare the results to a known emulsifier. A known rosin emulsifier, disproportionated wood rosin and partially hydrogenated-tallow fatty acids, was used as a control. The control emulsifier and a boron trifluoride treat-diproportionated mixed acid product were compounded into the following recipe:

|  | Grams |
|---|---|
| Polymer | 200 |
| Sphenon 9 (EPC carbon) | 80 |
| Zinc oxide | 10 |
| Sulfur | 4 |
| Altax (accelerator) | 4 |
| Emulsifier | 10 |

The preparation of the rubber and the addition of the acids was carried out as follows.

A two-roll laboratory mill was set at 125° F. (full $H_2O$) with a mill opening at 0.030 inch. The polymer was banded on the fast roll and cross cuts (¾″ cuts) made every 30 seconds from alternate sides for ten minutes. The carbon black was added evenly across the roll at a mill setting of 0.55 inch. The other chemicals were added at the same mill setting and run through 10 times at 0.30 inch setting, while cross cutting each side three times. The polymer is again banded on the fast roll at 0.55 inch. The emulsifiers were added and the stock was cross cut (¾″ cuts) three times each way and then end-rolled six times at 0.030 inch. The rubber was sheeted out by running through the mill 10 times at a mill setting of 0.008 inch and then sheeted off at a setting of 0.055 inch, cut with the grain and cured. Type C tensile specimens were cut from each sheet at each cure time. Physical properties of the rubber specimen were determined according to ASTM D412–52T and D314–58. The physical properties of the rubber shown below as plus or minus the corresponding values for the control.

PHYSICAL PROPERTIES OF SBR

|  | Mixed distilled tall oil acids | Kettle oil BF$_3$ treated redistilled |
|---|---|---|
| Modulus at 300%, Cure time, Minutes: |  |  |
| 25' | +36 | +33 |
| 50' | −14 | +76 |
| 100' | −4 | +20 |
| Tensile 50' | +94 | +259 |
| Elongation 50' | +8 | 0 |
| Hardness Shore A 50' | +2 | +1 |

In carrying out the process of the invention, the tall oil may be either crude tall oil or a tall oil distillate fraction. The use of tall oil distillate is preferred, even though the initial distillation entails an additional processing step, as soap specifically suited for a particular type of rubber polymerization can be produced most easily from this product. Thus where a fatty acid soap for use where oleic soaps are now employed is desired, a tall oil distillate fraction containing low quantities of rosin, i.e., 0 to 10% rosin, should be employed as the starting material. Where a soap is desired to replace wood rosin soap, a tall oil distillate fraction containing low quantities of fatty acids, i.e., 3 to 15%, should be used. But where a soap is desired to replace the mixed tallow-rosin soaps either the crude tall oil or a distilled tall oil fraction containing 30 to 60% rosin acids may be employed. By proper selection of the tall oil fraction to be used, an infinite number of tall oil products can be prepared having any ratio of fatty to rosin acids which are desired as the treated tall oil acids will contain essentially the same ratio of rosin to fatty acids as the starting material.

The initial step in treating the tall oil consists of disproportionating the tall oil by the use of any of the well-known disproportion catalysts. Use of iodine produces an excellent intermediate material for the boron trifluoride treatment and is the preferred catalyst. Tall oil acids are first heated with from about 0.1 to 3.0% of iodine, preferably from about 0.4 to 1.0%, at temperatures from about 320° F. to 550° F., for a period of time from 20 minutes to 5 hours, preferably for about 1 hour or until the abietic type acid content is less than 2% and the linoleic acid content is less than 2% as measured by GLC analysis. The reduction in both linoleic acid and abietic type acid content to the levels specified has been found to be critical to the further treatment with boron trifluoride. While products containing somewhat higher linoleic acid and abietic type acid contents without BF$_3$ treatment can be employed in rubber polymerization these products have a detrimental effect on the physicals of the rubber produced and are consequently not satisfactory.

When reaction temperatures above 550° F. are used, decarboxylation of the acids occurs and below 320° F., the reaction rate is extremely low and it is not possible to achieve the desired degree of conversion within practical limits of time. The preferred temperature for conducting the reaction is about 485–500° F. The time required to achieve adequate conversion will of course vary a great deal depending upon the temperature employed, and the quantity of catalyst used.

After the heating step, the tall oil may be advantageously sparged to sublime the catalyst in order to lower the color. Iodine or iodine compounds are preferably removed by steam sparging at elevated temperatures, preferably 320° F. to 550° F. for from about 1 hour to 4 hours. Any other suitable means may be used such as sparging with an inert gas or chemical treatment.

After sparging the disproportionated tall oil is next treated at a temperature between about 300° F. and 520° F. with from .01% to 2.0% boron trifluoride catalyst from about 15 minutes to 2 hours and thereafter raising the temperature within the above range. The preferred conditions of treatment with a boron trifluoride catalyst are to initially contact the heated material at 300° F. to 350° F. for approximately thirty minutes to one hour with 0.03% to 0.50% BF$_3$ then rapidly heating to about 480° F. to 520° F., i.e., about 15 minutes or within such time as to prevent degradation of the final product. It appears that the time for heat treating the disproportionated tall oil acids after initial contact with BF$_3$ is critical. Lengthy heating time, i.e., over 1½ hours leads to degradation of the final product. The treated product is then sparged preferably with steam.

The BF$_3$ treated product may not be converted to soap but better results are obtained by distilling this product (redistilling if the starting material was a tall oil distillate) before conversion. As mentioned above this separation is designed to remove all components having a boiling point lower than 16 carbon fatty acids or about 5%, and all components having a higher boiling point than any of the monomeric rosin acids or about 15% of the total treated material. Typically, distillation raises the acid number.

Various changes may be made in the examples specifically set forth without departing from the spirit of the invention or the scope of the appended claims.

We claim:
1. In a process for treating tall oil, wherein the abietic type acid content and the linoleic acid content have been reduced by disproportionation to less than 2% of said tall oil, the improvement which comprises, heating said disproportioned tall oil in the presence of from 0.01% to 2.0% boron trifluoride catalyst at a temperature from 300° F. to 350° F. for from 30 minutes to one hour, said temperature being subsequently raised to from 480° F. to 520° F. at such rate as to prevent degradation of the final product.

2. The process of claim 1 wherein said disproportioned tall oil is heated in the presence of from 0.03% to 0.50% boron trifluoride catalyst.

3. The process of claim 2 wherein said disproportionated tall oil is steam sparged before boron trifluoride treatment.

4. The process of claim 1 wherein the tall oil is selected from the group consisting of crude tall oil and tall oil distillate.

5. The process of claim 2 wherein the tall oil is a mixture of fatty acids and rosin acids, said fatty acids being from 40 to 70% and said rosin acids from 30 to 60%.

6. The process of claim 2 wherein the tall oil contains from 3 to 15% fatty acids, the remainder being rosin acids and unsaponifiable materials.

7. The process of claim 2 wherein the tall oil contains up to 10% rosin acids, the remainder being fatty acids and unsaponifiable materials.

8. The process of claim 2 wherein the disproportionated boron trifluoride treated tall oil is distilled by removing the fatty acid components having a lower boiling point than 16 carbon atoms and the components having a higher boiling point than any of the monomeric rosin acids.

9. The process of producing a rubber emulsifier which comprises disproportionating tall oil in the presence of from 0.1% to 1.0% iodine at a temperature from 320° F. to 550° F. until the abietic type acid content and linoleic acid content have each been reduced to less than 2% of said tall oil, steam sparging at a temperature of from 320° F. to 550° F. for one to four hours, contacting said disproportionated tall oil in the presence of from 0.03% to 0.5% boron trifluoride catalyst at a temperature of from 300° F. to 350° F. for 30 minutes to one hour said temperature being subsequently raised to from 480° F. to 520° F. at such rate as to prevent degradation of the final product, steam sparging said boron trifluoride treated disproportionated tall oil, and subjecting the boron trifluoride disproportionated tall oil to distillation whereby the materials boiling higher than the monomeric rosin acids and lower than the $C_{16}$ fatty acids are removed.

References Cited

UNITED STATES PATENTS

| | | | |
|---|---|---|---|
| 2,311,386 | 2/1943 | Patrick et al. | 260—97.5 |
| 2,617,792 | 11/1952 | Floyd | 260—97.5 |
| 2,980,733 | 4/1961 | Sowa, F. | 260—555 |

FOREIGN PATENTS 556,456  10/1943  Great Britain.

OTHER REFERENCES

Harris, G. "Encyclopedia of Chem. Technology," December 1953 (pp. 796–798 relied on).

DONALD E. CZAJA, Primary Examiner

W. E. PARKER, Assistant Examiner

U.S. Cl. X.R.

260—27, 41.5, 83.7